(12) United States Patent
Smus et al.

(10) Patent No.: US 9,882,658 B2
(45) Date of Patent: *Jan. 30, 2018

(54) COMMUNICATING DATA WITH AUDIBLE HARMONIES

(71) Applicant: Google Inc., Mountain View, CA (US)

(72) Inventors: Boris Smus, San Francisco, CA (US); Pascal Tom Getreuer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,933

(22) Filed: Aug. 18, 2017

(65) Prior Publication Data

US 2017/0346573 A1    Nov. 30, 2017

Related U.S. Application Data

(63) Continuation of application No. 14/748,680, filed on Jun. 24, 2015, now Pat. No. 9,755,764.

(51) Int. Cl.
*H04B 11/00* (2006.01)
*G10H 1/38* (2006.01)
*G10H 1/00* (2006.01)

(52) U.S. Cl.
CPC ........... *H04B 11/00* (2013.01); *G10H 1/0058* (2013.01); *G10H 1/38* (2013.01); *G10H 2210/066* (2013.01); *G10H 2210/086* (2013.01); *G10H 2240/251* (2013.01)

(58) Field of Classification Search
CPC .................................. H04B 11/00; G10H 1/38

USPC ........................................................... 84/609
See application file for complete search history.

(56) References Cited

U.S. PATENT DOCUMENTS

| 4,504,933 | A | * | 3/1985 | Janney | G08B 3/10 340/815.69 |
| 5,293,385 | A | * | 3/1994 | Hary | G06F 3/16 714/38.13 |
| 5,371,854 | A | * | 12/1994 | Kramer | G07C 3/00 704/258 |
| 5,606,144 | A | * | 2/1997 | Dabby | G10H 1/0025 84/609 |

(Continued)

FOREIGN PATENT DOCUMENTS

| EP | 1161075 | 12/2001 |
| JP | 2012-015853 | 1/2012 |

OTHER PUBLICATIONS

Hinch, "Data Transfer through Audio," Buyer Blog, May 21, 2015 [retrieved on Jun. 22, 2015]. Retrieved from the Internet: URL<http://ebuyer.com/blog/2015/05/data-transfer-through-audio/>, 8 pages.

(Continued)

*Primary Examiner* — David Warren
(74) *Attorney, Agent, or Firm* — Fish & Richardson P.C.

(57) ABSTRACT

In some implementations, a process for communicating data over audio is performed. In one aspect, one or more ordered sequences of audio attribute values that are selected based on a musical relationship between the audio attribute values and associated with data values may be played by a first device and received by a second device. This technique may allow for sound-based communications to take place between devices that listeners may find pleasant.

20 Claims, 11 Drawing Sheets

(56) References Cited

U.S. PATENT DOCUMENTS

| | | | | |
|---|---|---|---|---|
| 6,088,675 | A * | 7/2000 | MacKenty | G10L 13/027 704/260 |
| 6,137,045 | A * | 10/2000 | Short | G10H 7/002 84/603 |
| 6,442,523 | B1 * | 8/2002 | Siegel | G06F 17/30017 434/169 |
| 6,449,501 | B1 * | 9/2002 | Reuss | A61B 5/14551 600/322 |
| 6,876,981 | B1 * | 4/2005 | Berckmans | G06Q 40/00 705/1.1 |
| 7,069,211 | B2 | 6/2006 | Chiu et al. | |
| 7,135,635 | B2 * | 11/2006 | Childs | G10H 1/0025 700/94 |
| 7,138,575 | B2 * | 11/2006 | Childs, Jr. | G06Q 40/00 700/94 |
| 7,349,481 | B2 | 3/2008 | Steentra et al. | |
| 7,504,573 | B2 * | 3/2009 | Hiramatsu | G10H 1/24 84/600 |
| 7,511,213 | B2 * | 3/2009 | Childs, Jr. | G06Q 40/00 84/600 |
| 7,629,528 | B2 * | 12/2009 | Childs, Jr. | G06Q 40/00 84/600 |
| 8,183,451 | B1 * | 5/2012 | Panaiotis | G10H 1/0025 84/601 |
| 8,247,677 | B2 * | 8/2012 | Ludwig | G10H 1/06 84/622 |
| 8,878,043 | B2 * | 11/2014 | Cheever | G10H 1/38 84/609 |
| 8,994,549 | B2 * | 3/2015 | Rocha | E21B 47/101 166/65.1 |
| 9,286,876 | B1 * | 3/2016 | Dabby | G10H 7/002 |
| 9,286,877 | B1 * | 3/2016 | Dabby | B42D 15/022 |
| 9,578,418 | B2 * | 2/2017 | Le Nerriec | H04R 3/12 |
| 2002/0156807 | A1 * | 10/2002 | Dieberger | G06F 17/24 715/202 |
| 2002/0177986 | A1 * | 11/2002 | Moeckel | G06F 17/50 703/7 |
| 2004/0055447 | A1 * | 3/2004 | Childs, Jr. | G06Q 40/00 84/615 |
| 2005/0055267 | A1 * | 3/2005 | Chasanoff | G06Q 40/04 84/609 |
| 2008/0210082 | A1 * | 9/2008 | Sumita | G10G 3/04 84/603 |
| 2008/0271592 | A1 * | 11/2008 | Beckford | G10H 1/0008 84/645 |
| 2009/0000463 | A1 * | 1/2009 | Childs, Jr. | G06Q 40/00 84/615 |
| 2011/0308376 | A1 * | 12/2011 | Ludwig | G10H 1/06 84/604 |
| 2012/0047216 | A1 * | 2/2012 | Rhie | H04M 1/2478 709/206 |
| 2012/0067195 | A1 * | 3/2012 | Skaggs | G09B 15/026 84/477 R |
| 2012/0198985 | A1 * | 8/2012 | Ludwig | G10H 1/06 84/604 |
| 2012/0260790 | A1 * | 10/2012 | Ludwig | G10H 1/06 84/604 |
| 2013/0000465 | A1 * | 1/2013 | Gurule | G10H 1/0025 84/609 |
| 2013/0058507 | A1 | 3/2013 | Arknaes-Pedersen et al. | |
| 2015/0081282 | A1 | 3/2015 | Schimke et al. | |
| 2015/0213789 | A1 * | 7/2015 | Plott | G10H 1/18 84/645 |
| 2016/0379672 | A1 * | 12/2016 | Smus | H04B 11/00 704/207 |

OTHER PUBLICATIONS

Kauffmann, "Tone: An experimental Chrome extension for instant sharing over audio," Google Research Blog, May 19, 2015 [retrieved on Jun. 22, 2015]. Retrieved from the Internet: URL<http://googleresearch.blogspot.com/2015/05/tone-experimental-chrome-extension-for.html>, 8 pages.

International Search Report and Written Opinion in International Application No. PCT/US2016/034134, dated Aug. 24, 2016, 11 pages.

* cited by examiner

400a

| 410a symbol structure → K = {C₄, E₄, G₄} T = 2 | Distinct Value 412a | Distinct Value 414a | Distinct Value 416a | Distinct Value 418a |
|---|---|---|---|---|
| Integer Notation 422a | [0,4,-] | [-,4,7] | [0,-,7] | [-,-,-] |
| Musical Notation 424a | E C | G E | G C | n/a (rest) |
| Frequency Peaks (Hz) 426a | 261.6, 329.6 | 329.6, 392 | 261.6, 392 | n/a (rest) |

| 410b symbol structure → K = {C₄, E₄, G₄} | Distinct Value 412b | Distinct Value 414b | Distinct Value 416b | Distinct Value 418b | Distinct Value 420b | Distinct Value 422b | Distinct Value 424b | Distinct Value 426b |
|---|---|---|---|---|---|---|---|---|
| Integer Notation 422b | [-,-,-] | [0,-,-] | [-,4,-] | [0,4,-] | [-,-,7] | [0,-,7] | [-,4,7] | [0,4,7] |
| Musical Notation 424b | n/a (rest) | C | E | E C | G | G C | G E | G E C |
| Frequency Peaks (Hz) 426b | n/a (rest) | 261.6 | 329.6 | 261.6, 329.6 | 392 | 261.6, 392 | 329.6, 392 | 261.6, 329.6, 392 |

```
┌─────────────────────────────────────────────────────┐
│ Determine a set of audio attribute values to be     │
│ modulated to transfer a data set between devices    │
│ that are selected based on a musical relationship   │
│ between the audio attribute values    710           │
└─────────────────────────────────────────────────────┘
                          ↓
┌─────────────────────────────────────────────────────┐
│ Determine a symbol map associating each possible    │
│ data value for the data set with an ordered         │
│ sequence of audio attribute values from the set of  │
│ audio attribute values                 720          │
└─────────────────────────────────────────────────────┘
                          ↓
┌─────────────────────────────────────────────────────┐
│ Determine, for each data value in the data set, the │
│ ordered sequence of audio attribute values          │
│ associated with the data value from the symbol map  │
│                                        730          │
└─────────────────────────────────────────────────────┘
                          ↓
┌─────────────────────────────────────────────────────┐
│ Play ordered sequences of sounds representing each  │
│ data value in the data set                          │
│                                        740          │
└─────────────────────────────────────────────────────┘
```

```
┌─────────────────────────────────────────────────────────────┐
│ Identify a symbol map associating each data value in a data set │
│   with an ordered sequence of audio attribute values         │
│                                                       *810*  │
└─────────────────────────────────────────────────────────────┘
                              │
                              ▼
┌─────────────────────────────────────────────────────────────┐
│         Receive a plurality of sounds from a sending device  │
│                                                       *820*  │
└─────────────────────────────────────────────────────────────┘
                              │
                              ▼
┌─────────────────────────────────────────────────────────────┐
│ Identify ordered sequences of the received sounds that have  │
│ audio attribute values associated with data values in the symbol │
│                            map                        *830*  │
└─────────────────────────────────────────────────────────────┘
                              │
                              ▼
┌─────────────────────────────────────────────────────────────┐
│ Assemble the data values according to an order in which the  │
│  identified sequences were received to form the data set     │
│                                                       *840*  │
└─────────────────────────────────────────────────────────────┘
```

FIG. 8

COMMUNICATING DATA WITH AUDIBLE HARMONIES

CROSS-REFERENCE TO RELATED APPLICATION

This application is a continuation of U.S. application Ser. No. 14/748,680, filed Jun. 24, 2015, the contents of which are incorporated by reference herein.

TECHNICAL FIELD

This disclosure generally relates to performing data transfers using audio signals, and specifically to using audio signals made up of tones chosen according to a musical relationship.

BACKGROUND

Portable devices allow users to communicate with other users using various mechanisms, such as Short Message Service (SMS) text messages, email, and instant messages. Such communications, generally, utilize a wide area network, such as a cellular network, or a local area network, such as a WiFi or Bluetooth network. Such portable devices also generally include a microphone or other device for receiving audible input (e.g., from the user), and speakers for producing audible output.

SUMMARY

In general, an aspect of the subject matter described in this specification may involve a process for communicating data with audible harmonies. This process may allow for sound-based communications to take place between devices that listeners may find pleasant.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifying information can be determined for the user, or a user's geographic location may be generalized where location information is obtained, such as to a city, zip code, or state level, so that a particular location of a user cannot be determined. Thus, the user may have control over how information is collected about him or her and used by a content server.

In some aspects, the subject matter described in this specification may be embodied in methods that may include the actions of determining a set of audio attribute values to be modulated to transfer a data set between devices, wherein the set of audio attributes values are selected based on a musical relationship between the audio attribute values, determining a symbol map associating each possible data value for the data set with an ordered sequence of audio attribute values from the set of audio attribute values, and sending the data set to one or more receiving devices The action of sending the data to one or more receiving devices may include, for each data value in the data set, determining the ordered sequence of audio attribute values associated with the data value from the symbol map and playing an ordered sequence of sounds representing the data value, each sound having an audio attribute value in the determined ordered sequence of audio attribute values.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, implementations may include the set of audio attributes values being pitch values and the musical relationship being a chordal relationship between the pitches. In these implementations, the chordal relationship may be a major chord relationship, a minor chord relationship, a major seventh chord relationship, a minor seventh chord relationship, an augmented chord relationship, a diminished chord relationship, a suspended chord relationship, or combinations thereof.

In one aspect, each of the one or more sounds in the ordered sequence includes a plurality pitches played substantially simultaneously. In some examples, the symbol map includes a chord progression including a plurality of sets of pitch values, and timing information indicating when each set of pitch values will be used to send associated data values. In these examples, each set of pitch values may be selected based on a chord relationship between the pitch values in the set.

In some implementations, the set of audio attributes may include duration values. In such implementations, the musical relationship may be a rhythmic relationship between the durations. In some examples, the set of audio attributes may include envelope shape parameter values.

In some implementations, the symbol map may be stored by the one or more receiving devices before the data set is sent. In these implementations, the one or more receiving device may store a plurality of different symbol maps, and the action of sending the data set may include sending a header including an identifier of a particular symbol map to be used when transferring the data set.

In some examples, sending the data set may include sending a header between the sending device and the receiving devices including the symbol map. Sending the header including the symbol map may, for instance, include playing an ordered sequence of sounds representing each data value in the symbol map based on a default symbol map.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, implementations may include identifying a symbol map associating each possible data value for the data set with an ordered sequence of audio attribute values from a set of audio attribute values selected based on a musical relationship between the audio attribute values, receiving a plurality of sounds from a sending device, identifying ordered sequences of the received sounds having audio attribute values associated with data values in the symbol map, and assembling the data values according to an order in which the identified sequences were received to form the data set.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 4a and 4b are tables for exemplary mappings of symbols to distinct values.

FIGS. 7 and 8 illustrate exemplary processes for communicating data using audible harmonies.

Like reference symbols in the various drawings indicate like elements.

DETAILED DESCRIPTION

This application describes techniques for transferring data between devices using audible signals made up of musically-related tones. One example method selecting one or more ordered sequences of audio attribute values based on a musical relationship between the audio attribute values. Each sequence is associated with a particular data value, such that the ordered sequence may be played by a first device (e.g., using a speaker) to encode the data value. The sequence may be received by a second device (e.g., using a microphone), and decoded to produce the data value. Therefore, the techniques described herein may enable such devices to exchange data using sound-based communications that are melodic and pleasant to nearby listeners. The communication protocols described herein support sound-based communications in a wide variety of musical styles, which may provide for enhanced user customization and experience.

The present techniques may offer several advantages over previous techniques. For example, the present techniques allow for localized data transfers between devices without the use of a local or wide area network, such as a Wifi or cellular network. Because such networks often charge fees for data transfers, users may perform data transfers to other users proximate to them without having to pay these charges. Further, because the frequencies of the tones used to represent various data values are chosen according to a musical relationship, the resulting audible signal may be pleasing to a user and others within earshot, as opposed to previous techniques where the audible signals may be perceived simply as noise or an unpleasant collection of unrelated tones. The techniques may also allow for variation of the musical relationship between the tones during a message, which may make the audible signal more pleasing and musical. Further, the dynamic nature of the communication structure provided by these techniques may allow users to create a "signature" sound by defining various signal attributes of messages.

Figure 1:
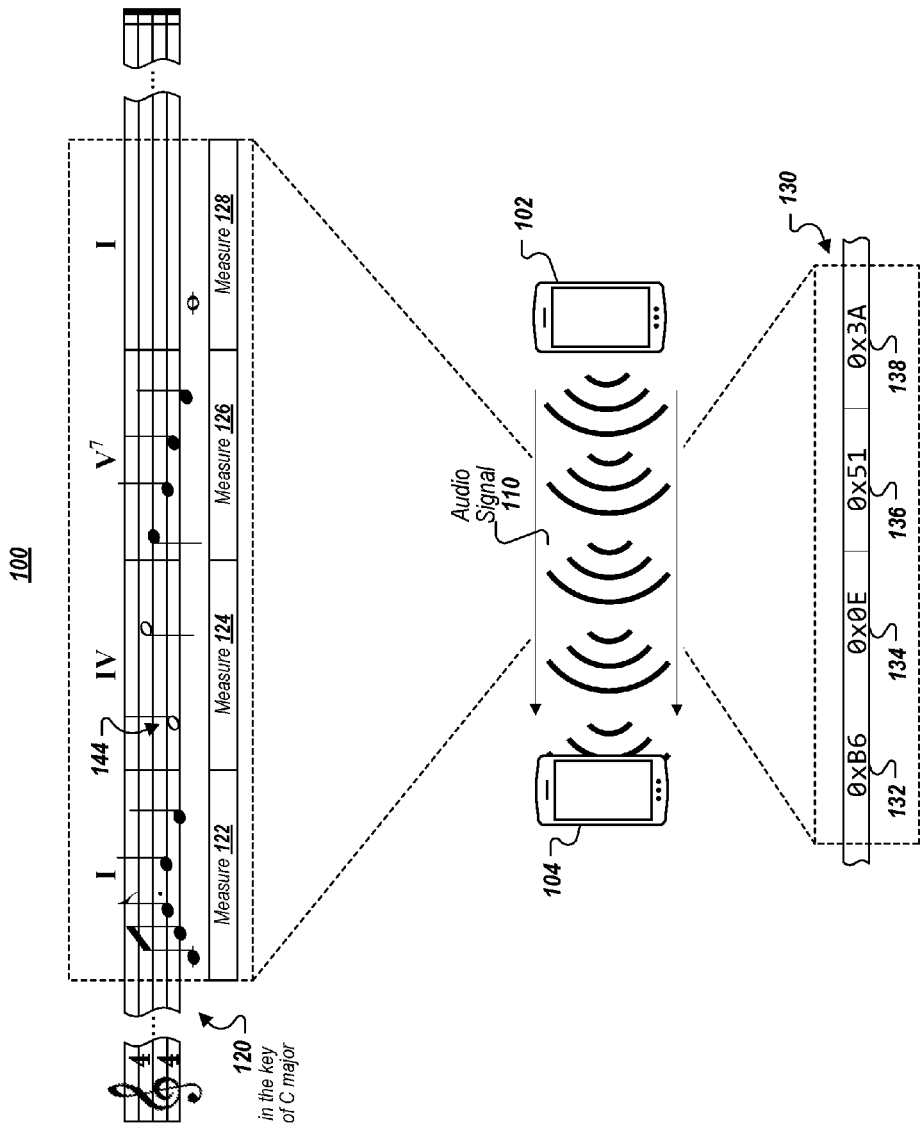
FIG. 1 illustrates an example of a system for communicating data between devices with audible harmonies.

FIG. 1 illustrates an example of a system 100 for communicating data between devices using audible harmonies. The system 100 includes a first client device 102 and a second client device 104. The first and second client devices 102 and 104 may include mobile computing devices (e.g., cellular phones, tablets, etc.), laptop computers, desktop computers, and other computing devices.

In operation, the first client device 102 transmits a data set to the second client device 104 by playing an audio signal 110 that is encoded with the data set through a speaker included in the first client device 102. The second client device 104 captures the audio signal 110 using a microphone included in the second client device 104, and decodes the data set from the captured signal. The audio signal 110 includes multiple symbols each made up of one or more musical tones. Each symbol represents a particular data value, allowing a data set to be represented by a series of one or more musical notes or chords containing multiple notes. The pitches of the notes used in the symbols may be chosen according to a musical or harmonic relationship to one another, so that the resulting audio signal may be perceived by a user as musical.

For example, a user of the first client device 102 may want to share a website with a user of the second client device 104. The user of the first client device 102 may interact with an application running on the first client device 102 to send the URL for the website to the user of the second client device 104 as an auditory message in the musical style of a basic rock song (e.g., a I, IV, $V^7$, I chord progression). The first client device 102 may transmit the URL to the second client device 104 by playing audio signal 110 that is encoded with a data set that indicates the URL for the website. The second client device 104 captures the audio signal 110, extracts the URL, and provides the user of the second client device 104 with access to the corresponding website.

Audio signal 110 may include a melody 120 in a particular musical key (e.g., C major). In some examples, the melody 120 may resemble a popular song, such as by following a chord progression used by the song. One or more concurrent tones or series of single tones included in the melody may be used as symbols to represent data values in the data set to be transferred. The attributes of melody 120, e.g., the particular pitch, duration, and order of the sequence of symbols, may be representative of data set 130.

When generating the audio signal 110, the first client device 102 may map each possible data value of the data set 130 to a set of attributes to be played in melody 120. For example, the first client device 102 may map a different symbol to each of the first 256 integer values (e.g., 0-255), such that each symbol represents one byte of information. If a different number of symbols are mapped, the amount of information represented by each symbol may be different. For example, if two distinct symbols are mapped, each symbol represents 1 bit of information (e.g., 0 or 1). The first client device 102 may reference a symbol map in order to convert data set 130 to melody 120. Upon receiving the audio signal 110, the second client device 104 may map the attributes of melody 120 to data values in order to decode the data set 130. That is, the second client device 104 may reference the symbol map in order to convert melody 120 to data set 130.

The symbol map may be known to the first and second client devices 102 and 104 in advance, e.g., prior to the first client device 102 playing audio signal 110. In some implementations, the audio signal 110 may be utilized by the first client device 102 to indicate the symbol map to the second client device 104. For instance, the first client device 102 may include data that indicates the symbol map in a header portion of the audio signal 110, e.g., a portion of audio signal 110 that precedes melody 120. This data may include an identifier of a pre-defined symbol map known to both client devices, or may include a representation of a new symbol map chosen by the first client device 102.

Melody 120 may be made up of measures 122, 124, 126, and 128a, which represent different segments of time and correspond to a specific number of beats. A series of musical chord changes may occur throughout measures 122, 124, 126, and 128a such that melody 120 may follow a particular chord progression.

In some implementations, melody 120 may follow a chord progression as dictated by the symbol map. The particular chord progression exhibited by melody 120 in the example of FIG. 1 is in the key of C major. In this example, measures 122, 124, 126, and 128a may correspond to chords I, IV, V$^7$, and I, in the key of C major, respectively. Since melody 120 is in the key of C major in this example, chord I corresponds to the musical notes of C-E-G, chord IV corresponds to the musical notes of F-A-C, and chord V$^7$ corresponds to the musical notes of F-G-B-D.

The symbol map may define the structure of melody 120. In this example, the symbol map may require that, for measure 122, data values be encoded as an ordered sequence of musical notes or chords that are selected from chord I, e.g., C, E, and G. The particular pitch, duration, and order of the sequence of notes included in measure 122 may, for example, be representative of the data value 132. That is, the second client device 104 may identify the portion of audio signal 110 corresponding to measure 122 as the data value 132, which is the hexadecimal value "0xB6" in this example. The symbol map may enable the second client device 104 to perform this type of melody to data value conversion. Similarly, the first client device 102 may use the symbol map to determine the particular sequence of notes that are to be played in measure 122 so as to indicate data value 132.

Continuing with the above example, data value 134 may be encoded in the portion of audio signal 110 corresponding to measure 124 as a particular sequence of the musical notes F, A, and C; data value 136 may be encoded in the portion of audio signal 110 corresponding to measure 126 as a particular sequence of the musical notes F, G, B, and D; and data value 138 may be encoded in the portion of audio signal 110 corresponding to measure 128a as a particular sequence of the musical notes C, E, and G.

The relationship between each measure of melody 120 and the chord in which data is encoded in is conveyed in the symbol map associated with the audio signal 110. By following the symbol map, the second client device 104 may, for example, expect to receive a sequence of the musical notes F, A, and C from first client device 102 for measure 124. The sequence of musical notes played by the first client device 102 in the chord progression of measures 122-128a, may represent the sequence of data values 132-138.

In this way, the structure of melody 120, as defined by the symbol map, may provide an audio attribute to data value mapping that varies as a function of time. In some cases, the symbol map may also specify one or additional characteristics of the transmitted audio signal. For example, one or more Attack-Decay-Sustain-Release ("ADSR") parameters for the envelope of the transmitted audio signal may vary according the symbol map.

In some implementations, envelope characteristics may dynamically change throughout melody 120 as indicated by the symbol map. This may, for instance, allow for melody 120 to emulate a song that is played using multiple instruments. The symbol map may also specify the key and tempo in which melody 120 is played. In addition, the symbol map may specify the time signature of melody 120, which is 4/4 in the example of system 100.

The structure of melody 120 that is defined by the symbol map may be represented as "S" in following expression:

$$S_i = (K_i, D_i, T_i) \quad (1)$$

where "i" is a symbol within melody 120, "K" is the chord from which notes may be selected to represent symbol i, "D" is the duration of symbol i, and "T" is the number of tones included in symbol i.

In the example of FIG. 1, the chord K may correspond to the chord progression of melody 120. The chord K of the structure for each symbol may be described as:

$$K_i = \{f_{i_1}, f_{i_2}, f_{i_n}\} \quad (2)$$

where each "$f_i$" corresponds to the frequency of a note included in the chord for symbol i and "n" is the total number of notes in the chord. For example, if the chord K is a major chord or minor chord, which are both triads (e.g., chords made up of three notes), then n would be equal to 3.

Similarly, if the chord K is a major seventh chord or a minor seventh chord, which are both tetrads (e.g., chords made up of four notes), then n would be equal to 4. For instance, symbols that are included in measure 126 may have a structure S with a chord K that may be described as:

$$K = \{F_4, G_4, B_4, D_5\} \quad (3)$$

where $F_4$ is a 4$^{th}$ octave F-note that has a 349.2 Hz pitch, $G_4$ is a 4$^{th}$ octave G-note that has a 392 Hz pitch, $B_4$ is a 4$^{th}$ octave B-note that has a 493.9 Hz pitch, and $D_5$ is a 5$^{th}$ octave D-note that has a 587.3 Hz pitch. It can be noted that the K for symbols of measure 126 contains four note (e.g., n=4), because it is a seventh chord. Since chord K may be defined on a symbol-by-symbol basis, it becomes possible to implement audio signal 110 with any desired chord progression.

The duration D of each symbol most simply corresponds to amount of time of which the tone(s) of the symbol are to be played. Consider an example in which the symbol map specifies that melody 120 is to be played at a tempo of 120 beats per minute ("BPM"). In this scenario, an exemplary symbol 144, which is a half note, may have a duration of 1 second.

The number of tones T indicates how many concurrent tones are to be played for each symbol. This parameter allows for symbols to be transmitted in the form of single notes, as well as full or partial chords. As described more fully below, these tones will also serve as a means by which various data encoding schemes may be implemented.

By encoding data using audio signals that are musically-harmonious and dynamic, the techniques described herein provide for sound-based communications that nearby persons may find pleasant. Further, these techniques may allow for a great degree of customization. In some implementations, the symbol map may be determined based on one or more user-defined parameters.

For instance, a user may able to select a chord progression for the symbol map. In the example described above, the user of first client device 102 may have interacted with an application running on the first client device 102 to specify that the website URL be transmitted using the chord progression of his favorite classic rock song. Such a selection would be reflected in the structure S of melody 120. In some examples, the Attack-Decay-Sustain-Release ("ADSR") envelope parameters may be user-defined. This may allow for the audio signal to be synthesized in a multitude of ways. In some implementations, envelope characteristics may dynamically change throughout the melody as indicated by the symbol map.

The musical relationships between the notes and chords included in the symbols may also vary. In some cases, the symbol map may specify that tones from a particular scale in a particular key will be used to make up the various symbols. For example, a symbol map may specify that the C pentatonic major scale is to be used, meaning that symbols will be formed by selecting notes and chords from the notes of that scale (e.g., [C, D, E, G, A]). The symbol map may specify other scales in a particular key, such as, for example, a major scale, a natural minor scale, a harmonic minor scale, a melodic minor scale, a pentatonic minor scale, a blues scale, a particular mode of a base scale (e.g., the Phrygian mode of the C major scale), or other scales.

Figure 2:
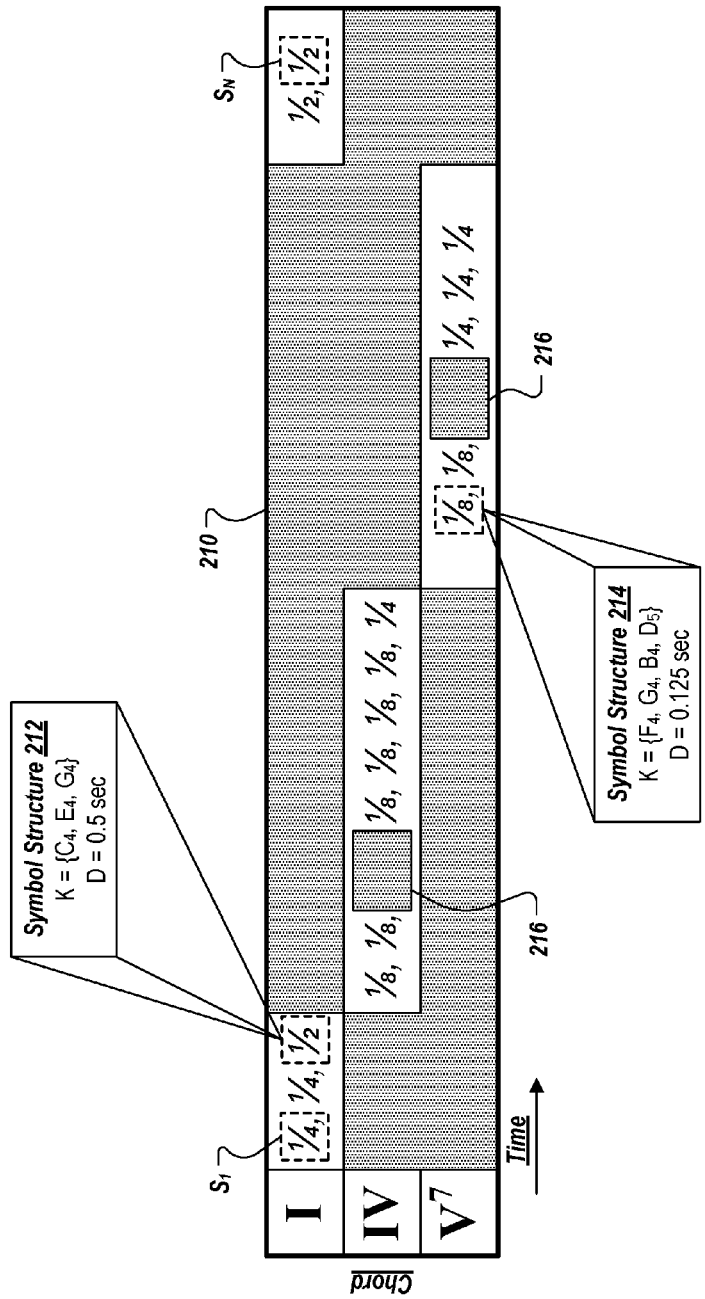
FIG. 2 is a conceptual diagram of an exemplary framework for providing a symbol map for use in communicating data between devices with audible harmonies in a system.

FIG. 2 illustrates a conceptual diagram of an exemplary framework for providing a symbol map for use in communicating data between devices with audible harmonies in a system 200. The system 200 includes a symbol map 210, which may function in a manner similar to that of symbol maps described above in association with FIG. 1. The symbol map 210 may provide structures $S_1$-$S_N$ which each correspond to a different symbol in a sequence of N symbols that are to be included in a melody produced in accordance with symbol map 210. Each symbol structure of the symbol map may specify various attributes (e.g., chord K, duration D, tones T, ADSR parameters, etc.) of its corresponding symbol. Additionally, the symbol map 210 provides the particular order in which the symbols are to occur in the melody.

In the example of FIG. 1, a melody produced by the first client device 102 may conform to symbol map 210 and the second client device 104 may decode a captured melody according to symbol map 210. That is, the first client device 102 may reference a symbol map, such as symbol map 210, in order to convert a data set to a melody. Similarly, the second client device 104 may reference the same symbol map 210 in order to convert the melody of the captured audio signal to a data set.

The symbol map 210 may be known to the first and second client devices 102 and 104 in advance, e.g., prior to the first client device 102 playing an audio signal. In some implementations, the audio signal produced by the first client device 102 may be utilized to indicate the symbol map to the second client device 104. For instance, the first client device 102 may include data that indicates the symbol map 210 in a header portion of the audio signal, e.g., a portion of audio signal 110 that precedes melody 120. This data may include an identifier of for symbol map 210, which may be known to both client devices, or may include a representation of symbol map 210 chosen by the first client device 102.

The symbol map 210 may provide the structure for its melody at a symbol-level. For instance, the symbol map 210 may specify the chord K, duration D, and tone T, as described above, for each symbol of the melody. The symbol map 210 may also specify ADSR envelope parameters for each symbol. In this particular example, the symbol map 210 provides a structure for a melody in the key of C major at a tempo of 240 BPM. The chord progression exhibited by the melody specified by symbol map 210, which extends from symbol $S_1$ to symbol $S_N$, may be viewed as a chord progression.

With symbol structure 212, for example, the symbol map 210 may specify that the third symbol of the melody be played for 0.5 seconds and include one or more of the tones $C_4$, $E_4$, and $G_4$. Since all of the symbols specified by symbol map 210 are in the key of C major, a symbol having structure 212 (e.g., the third symbol in the melody) may be viewed as including one or more tones selected from a I chord. Similarly, a symbol having structure 212 may be viewed as a half note, as it has a duration of 0.5 seconds where the tempo of the melody provided by the symbol map 210 is 240 BPM. The particular combination of tones $C_4$, $E_4$, and $G_4$ that are played as a symbol having structure 212 will, as described in more detail in the discussion of FIGS. 3a-4b below, depend on the particular one or more data values that are to be conveyed with that symbol.

With symbol structure 214, for example, the symbol map 210 may specify that the eleventh symbol of the melody be played for 0.125 seconds and include one or more of the tones $F_4$, $G_4$, $B_4$, and $D_4$. Since all of the symbols specified by symbol map 210 are in the key of C major, a symbol having structure 214 (e.g., the eleventh symbol in the melody) may be viewed as including one or more tones selected from a $V^7$ chord. Similarly, a symbol having structure 214 may be viewed as an eighth note, as it has a duration of 0.125 seconds where the tempo of the melody provided by the symbol map 210 is 240 BPM. The particular combination of tones $F_4$, $G_4$, $B_4$, and $D_4$ that are played as a symbol having structure 214 will, as described in more detail in the discussion of FIGS. 3a-4b below, depend on the particular one or more data values that are to be conveyed with that symbol.

In some examples, the symbol map 210 may include at least one free portion 216a-b within the melody structure. A free portion 216 within the melody as provided by the symbol map 210 may be a portion of the melody for which a symbol representing a data value is not specified. Rather than being representative of data values, such free portion 216 may be implemented within the melody for purposes of musical aesthetics. In the example of FIG. 1, the second client device 104 may determine, from symbol map 210, that a portion of the melody played by the first client device 102 corresponding to free portion 216 does not encode a data value. Accordingly, the second client device 104 may simply not perform decoding processes for free portion 216.

In some examples, audio may be played during the free portion 216 of the melody. In these examples, the audio played may not explicitly represent data values, but rather just be provided for musical aesthetics. Free portion 216 could, for instance, include drum or vocal tracks. In some implementations, the free portion 216 may include tones similar to those included in symbols specified by symbol map 210. In other examples, the symbol map 210 may include at least one free portion 216 as a rest so as to create rhythm within the melody. In reference to FIG. 1, the speaker of first client device 102 may, in these examples, be silent for the duration of free portion 216. The symbol map 210 may specify duration information for each of one or more free portions 216.

Figure 3A:
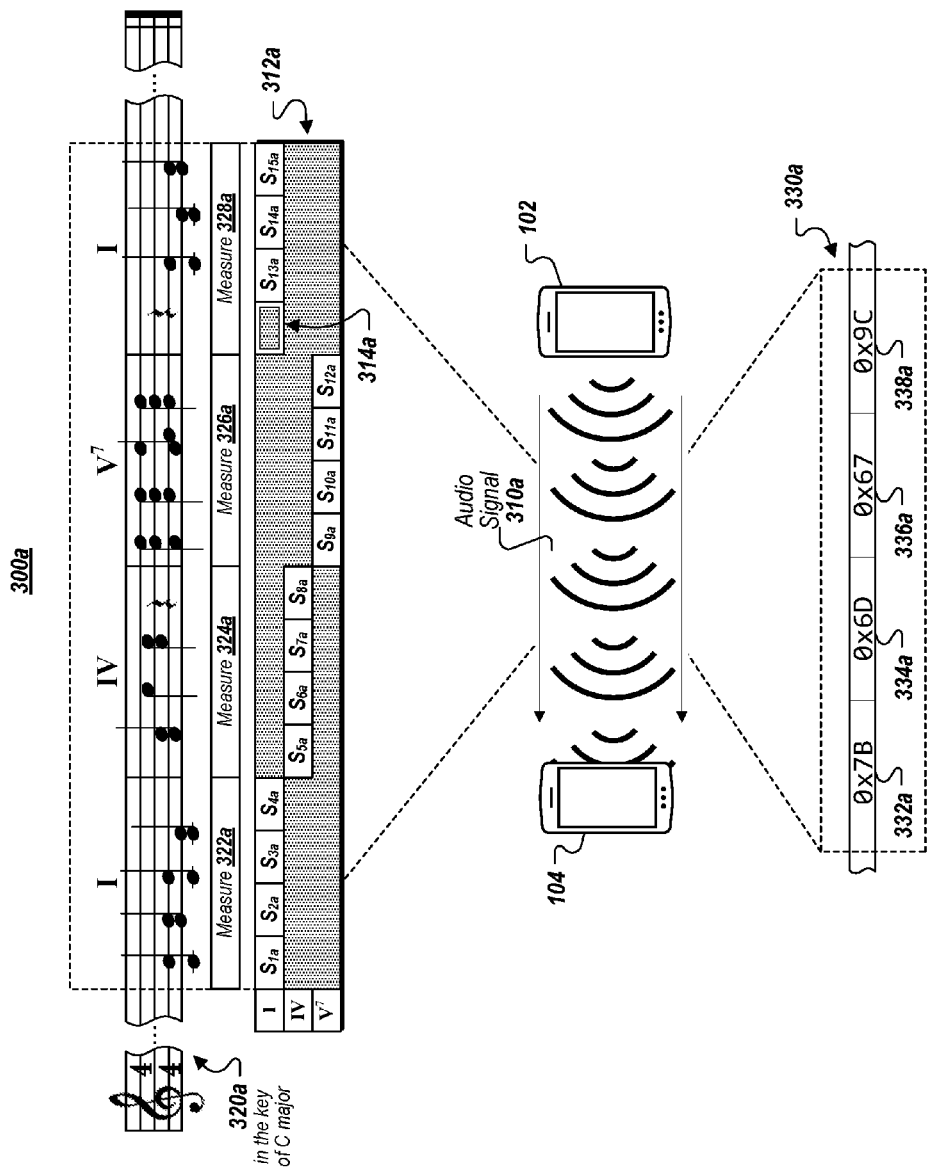
FIGS. 3a and 3b illustrate exemplary systems for communicating data between devices with audible harmonies.

FIG. 3a illustrates an example of a system 300a for communicating data between devices with audible harmonies. The system 300a may function in a manner similar to that of system 100 which has been described above in association with FIG. 1. Accordingly, system 300a includes first and second client devices 102 and 104.

In operation, the first client device 102 may transmit a data set 330a to the second client device 104 by, for example, playing an audio signal 310a having a melody 320a through a speaker that is included in the first client device 102. The second client device 104 may record the audio signal 310a using a microphone that is included in the second client device 104 and decode the data set 330a from the recording.

The melody 320a produced by the first client device 102 may conform to symbol map 312a and the second client device 104 may decode captured melody 320a according to symbol map 312a. That is, the first client device 102 may reference symbol map 312a in order to convert data set 330a to melody 320a. Similarly, the second client device 104 may reference the same symbol map 312a in order to convert the melody 320a of the captured audio signal 310a to data set 330a.

Melody 320a may be made up of measures 322a, 324a, 326a, and 328a, which represent different segments of time and correspond to a specific number of beats. As outlined in the symbol map 312a, a series of musical chord changes may occur throughout measures 322a, 324a, 326a, and 328a such that melody 320a may follow a particular chord progression. In this example, it can be seen that at least some of symbols included in each of measures 322a, 324a, 326a, and 328a are multi-tonal.

In some implementations, the number of tones defined for each symbol may be an exact number of tones that are to be included in the symbol. In the example of system 300a, measures 322a and 328a may have a T-value of 2, while measure 326a has a T-value of 3. In these implementations, different combinations of tones may represent different data values. The number of distinct values that can be encoded by the $i^{th}$ symbol, $v_i$, may be described as:

$$v_i = (n_i T_i) \quad (4)$$

where "$n_i$" is the total number of notes in the chord $K_i$ and $T_i$ is the exact number of tones that are to be included in the $i^{th}$ symbol. Each combination of tones may, for instance, correspond to a different data value.

For example, consider symbol for which symbol map 312a has specified a chord K that is a triad (e.g., n=3) and a T-value of 2. This exemplary symbol may, for example, be found in one of measures 322a, 324a, and 328a. The number of distinct values that can be encoded by this exemplary symbol would be 3. In other words, there are three possible combinations of tones that may be played concurrently as this symbol.

In some implementations, a symbol may also be represented as an absence of tones. If an absence of tones (e.g., a rest), were to be considered a symbol that is a fourth combination of tones, then each symbol under the scheme of the abovementioned example may be representative of two bits of data. Symbol $S_{8a}$, for example, may be considered such a symbol that is represented as an absence of tones. It is to be understood that symbol $S_{8a}$ is different than, for example, a free portion such as free portion 314a or that which has been described above in association with FIG. 2, as symbol $S_{8a}$ is representative of a distinct value.

In another example, consider a symbol for which a symbol map has specified a chord K that is a tetrad (e.g., n=4) and a T-value of 3. This exemplary symbol may, for example, be found in measure 326a. The number of distinct values that can be encoded by this exemplary symbol would be 4. In other words, there are four possible combinations of tones that may be played concurrently as this symbol. In this way, each symbol included in measure 326a may be viewed as being representative of two bits of data. Similarly, the sequence of four symbols included in measure 326a may viewed as being representative of 8 bits of data.

As with all audio attributes, the T-value may vary from symbol-to-symbol as defined by the symbol map 312a. For example, it can be seen that symbol $S_{6a}$, which is included as the second symbol in measure 324a and the sixth symbol in melody 320a, includes only a single note, $C_5$. While the symbol map 312a may have specified a T-value of 2 for the other symbols within measure 324a, e.g., $S_{5a}$, $S_{7a}$, and $S_{8a}$, the symbol map 312a may have specified a T-value of 1 for symbol $S_{6a}$. Given that a IV chord is a triad, symbol $S_{6a}$ may be capable of representing one of three distinct values.

In the example of system 300a, the portions of melody 320a corresponding to measures 322a, 324a, 326a, and 328a may correspond to data values 332a, 334a, 336a, and 338a, respectively. That is, sequences of symbols corresponding to structures $S_{1a}$-$S_{4a}$, $S_{5a}$-$S_{8a}$, $S_{9a}$-$S_{12a}$, and $S_{13a}$-$S_{15a}$ may be viewed as corresponding to data values 332a, 334a, 336a, and 338a, respectively.

FIG. 4a is a table 400a for an exemplary mapping of symbols to distinct values according to the example described in association with FIG. 3a. The table 400a illustrates how an exemplary symbol structure 410a, which may be specified by the symbol map described above in reference to FIG. 3a, can be utilized to represent different data values. A symbol which conforms to symbol structure 410a may, for example, include two tones (e.g., T=2) selected from the chord of C major (e.g., K={$C_4$, $E_4$, $G_4$}).

In accordance with implementations described above reference to FIG. 3a, it is understood that symbol structure 410a may provide for at least three distinct values. In other words, there are three different possible pairings of tones within a triad. These three distinct values are depicted in FIG. 4a as distinct values 412a, 414a, and 416a. The combination of tones representing each of the distinct values are indicated in table 400a in both integer and musical notations 422a-424a. The table 400a further includes frequency peak information 426a that indicates the frequency components of the combinations of tones corresponding to each distinct value. In some implementations in which a symbol may also be represented as an absence of tones, the exemplary mapping of symbols to distinct values may further include a distinct value 418a corresponding to a rest.

It can be understood that various messages can be conveyed in melodies through ordered sequences of symbols which are each representative of distinct values. In the example of FIG. 3a, the ordered sequence of symbols included in measure 322a may correspond to data value 322a. Consider an example in which the symbol map 312a defines each of the symbol structures $S_{1a}$, $S_{2a}$, $S_{3a}$, and $S_{4a}$ to have symbol structure 410a (e.g., K={$C_4$, $E_4$, $G_4$} and T=2). In this example, the first symbol of measure 322a may, for instance, be viewed as having symbol structure $S_{1a}$ and representing distinct value 416a. That is, the first symbol of measure 322a corresponds to distinct value 416a in that it includes the notes of $C_4$ and $G_4$. It follows that the third symbol of measure 322a may, in this example, also be viewed as representing distinct value 416a. Similarly, the second and fourth symbols of measure 322a may be viewed as having symbol structures $S_{2a}$ and $S_{4a}$ representing distinct values 414a and 412a, respectively.

Figure 3B:
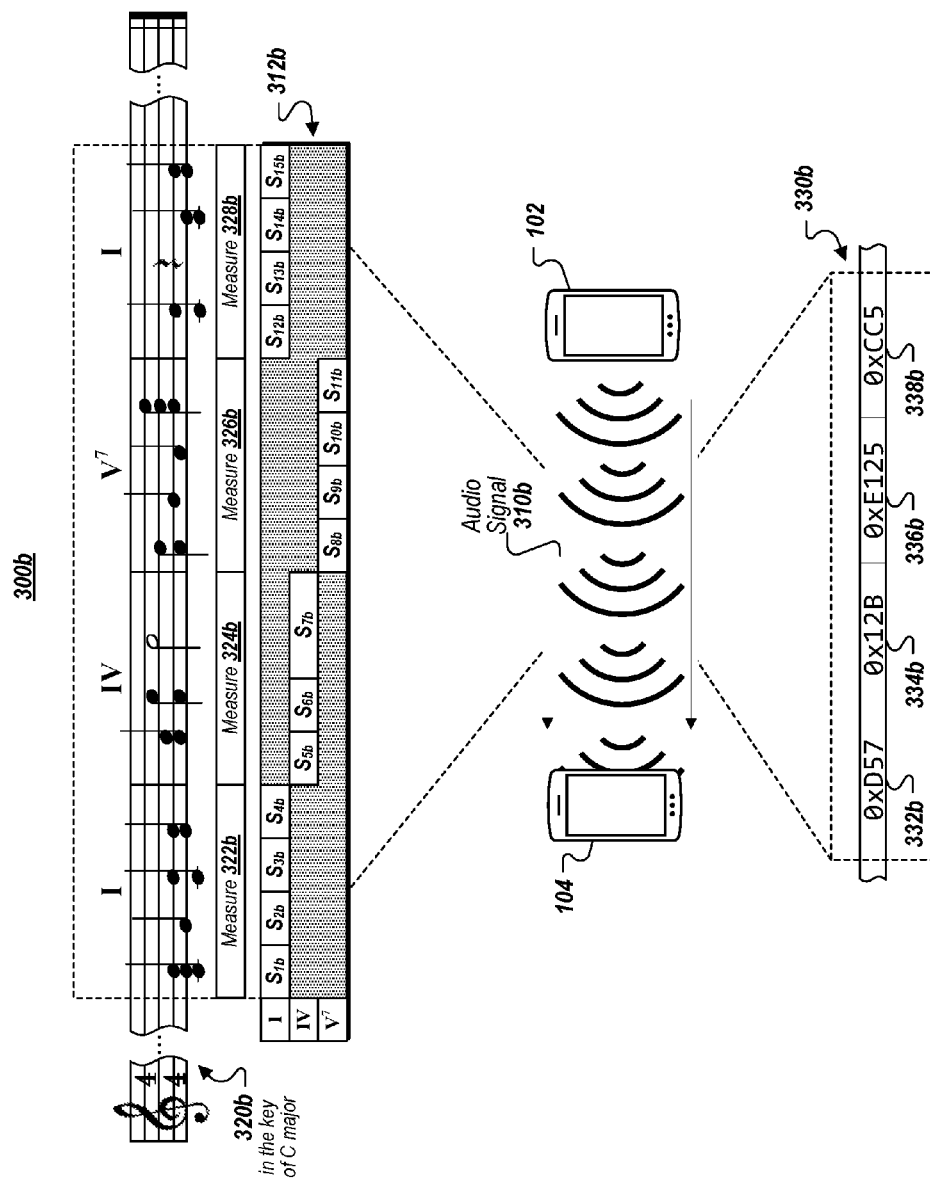

FIG. 3b illustrates an example of a system 300b for communicating data between devices with audible harmonies. The system 300b may function in a manner similar to that of system 100 which has been described above in association with FIG. 1. Accordingly, system 300b includes first and second client devices 102 and 104.

In operation, the first client device 102 may transmit a data set 330b to the second client device 104 by, for example, playing an audio signal 310b having a melody 320b through a speaker that is included in the first client device 102. The second client device 104 may record the audio signal 310b using a microphone that is included in the second client device 104 and decode the data set 330b from the recording.

The melody 320b produced by the first client device 102 may conform to symbol map 312b and the second client device 104 may decode captured melody 320b according to symbol map 312b. That is, the first client device 102 may reference symbol map 312b in order to convert data set 330b to melody 320b. Similarly, the second client device 104 may reference the same symbol map 312b in order to convert the melody 320b of the captured audio signal 310b to data set 330b.

Melody 320b may be made up of measures 322b, 324b, 326b, and 328b, which represent different segments of time and correspond to a specific number of beats. As outlined in the symbol map 312b, a series of musical chord changes may occur throughout measures 322b, 324b, 326b, and 328b such that melody 320b may follow a particular chord progression. In this example, it can be seen that symbols included in each of measures 322b, 324b, 326b, and 328b have varying numbers of tones.

In some implementations, the number of tones defined for each symbol may correspond to a maximum number of tones that may be played concurrently. A minimum number of tones that may be played as a symbol may also be considered. While the number of distinct values $v_i$ in the example described above in association with FIG. 3a may be equal to the binomial coefficient indexed by $n_i$ and $T_i$, the number of distinct values $v_i$ for implementations where the number of tones T corresponds to a maximum number of tones that may be played concurrently may be seen as a sum of binomial coefficients indexed by $n_i$ and each number of tones from the minimum number of tones to the maximum number of tones.

In some examples, the maximum number of tones that may be played concurrently may be equal to n (e.g., the number of tones included in chord K) and the minimum number of tones that may be played concurrently may be equal to zero (e.g., a rest). In these examples, each symbol may be viewed as being representative of n bits of data.

For example, consider a symbol for which a symbol map has specified a chord K that is a triad (e.g., n=3), the maximum number of tones is equal to n, and the minimum number of tones is equal to zero. This exemplary symbol may, for example, be found in one of measures 322b, 324b, and 328b. The number of distinct values that can be encoded by this exemplary symbol would be 8. In other words, there are eight possible combinations of tones that may be played concurrently as this symbol. In this way, each symbol included in measures 322b, 324b, and 328b may, for instance, be viewed as being representative of three bits of data.

In another example, consider a symbol for which a symbol map has specified a chord K that is a tetrad (e.g., n=4), the maximum number of tones is equal to n, and the minimum number of tones is equal to zero. This exemplary symbol may, for example, be found in measure 326b. The number of distinct values that can be encoded by this exemplary symbol would be 16. In other words, there are sixteen possible combinations of tones that may be played concurrently as this symbol. In this way, each symbol included in measure 326b may be viewed as being representative of four bits of data. Similarly, the sequence of four symbols included in measure 326b may viewed as being representative of 16 bits of data. Although zero and n have been described as exemplary minimum and maximum numbers of tones in reference to FIG. 3b, it is to be understood that the techniques described herein may be implemented using any desired value(s) as minimum and maximum numbers of tones.

In the example of system 300b, the portions of melody 320b corresponding to measures 322b, 324b, 326b, and 328b may correspond to data values 332b, 334b, 336b, and 338b, respectively. That is, sequences of symbols corresponding to structures $S_{1b}$-$S_{4b}$, $S_{5b}$-$S_{7b}$, $S_{8b}$-$S_{11b}$, and $S_{12b}$-$S_{15b}$ may be viewed as corresponding to data values 332b, 334b, 336b, and 338b, respectively.

FIG. 4b is a table 400b for an exemplary mapping of symbols to distinct values according to the example described in association with FIG. 3b. The table 400b illustrates how an exemplary symbol structure 410b, which may be specified by the symbol map described above in reference to FIG. 3b, can be utilized to represent different data values. A symbol which conforms to symbol structure 410b may, for example, include from zero to three tones (e.g., n=3) selected from the chord of C major (e.g., K={$C_4$, $E_4$, $G_4$}).

In accordance with implementations described above reference to FIG. 3b, it is understood that symbol structure 410b may provide for up to eight distinct values. These eight distinct values are depicted in FIG. 4b as distinct values 412b-426b. The combination of tones representing each of the distinct values are indicated in table 400b in both integer and musical notations 422b-424b. The table 400b further includes frequency peak information 426b that indicates the frequency components of the combinations of tones corresponding to each distinct value.

It can be understood that various messages can be conveyed in melodies through ordered sequences of symbols which are each representative of distinct values. In the example of FIG. 3b, the ordered sequence of symbols included in measures 322b and 328b may correspond to data values 322b and 328b, respectively. Consider an example in which the symbol map 312b defines each of the symbol structures $S_{1b}$, $S_{2b}$, $S_{3b}$, and $S_{4b}$ (e.g., corresponding to measure 322b) and $S_{12b}$, $S_{13b}$, $S_{14b}$, and $S_{15b}$ (e.g., corresponding to measure 322b) to have symbol structure 410b (e.g., K={$C_4$, $E_4$, $G_4$} and 0≤T≤3). In this example, the first symbol of measure 322b may, for instance, be viewed as having symbol structure $S_{1b}$ and representing distinct value 426b. That is, the first symbol of measure 322b corresponds to distinct value 416b in that it includes the notes of $C_4$, $E_4$, and $G_4$. It follows that the second, third, and fourth symbols of measure 322b may be viewed as having symbol structures $S_{2b}$, $S_{3b}$, and $S_{4b}$ representing distinct values 416b, 422b, and 424b, respectively. Similarly, the first, second, third, and fourth symbols of measure 326b may be viewed as having symbol structures $S_{12b}$, $S_{13b}$, $S_{14b}$, and $S_{15b}$ representing distinct values 422b, 412b, 418b, and 424b, respectively.

It is clear that the amount of data that can be conveyed by each symbol may depend, at least in part, upon the values of n and T. The symbol map may, for instance, be determined at least in part on a desired amount of data to be encoded by each symbol, measure, or melody.

Figure 5:
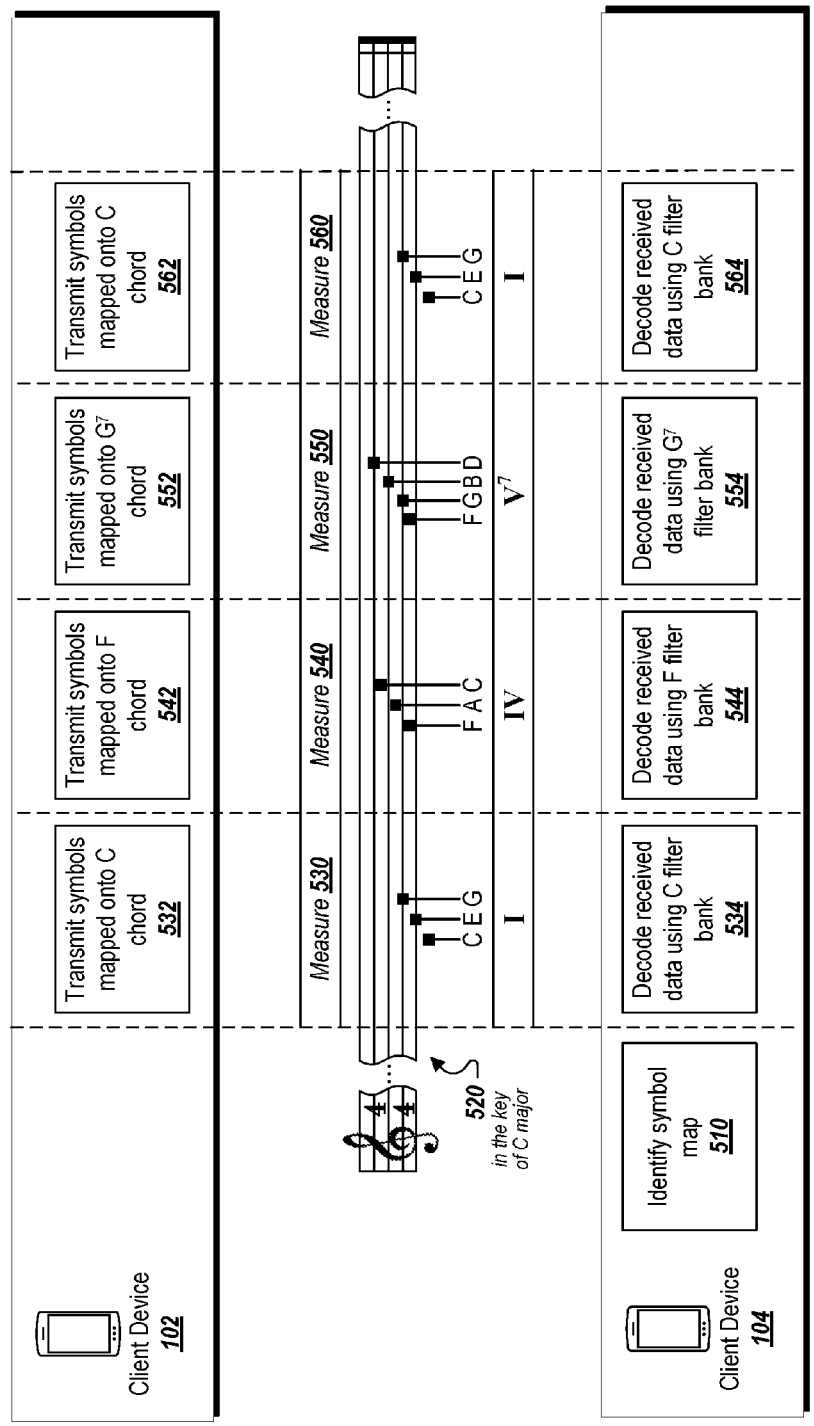
FIG. 5 illustrates an example of a sequence in which data is transferred with audible harmonies in a system.

FIG. 5 illustrates an example of a sequence in which data is transferred with audible harmonies in a system 500. The system 500 may function in a manner similar to that of systems 100, 300a, and/or 300b which have been described above in association with FIGS. 1, 3a, and 3b. More particularly, the diagram depicts first client device 102 and second client device 104. In operation, the first client device 102 may transmit a data set to the second client device 104 by, for example, playing an audio signal that is encoded with the data set through a speaker that is included in the first client device 102. The second client device 104 may record the audio signal using a microphone that is included in the second client device 104 and decode the data set from the recording.

Initially, the first client device 102 may determine the symbol map to be utilized in transmitting the audio signal. As described above, the symbol map selected may be influenced at least in part by user-defined parameters.

In some implementations, the symbol map may be selected based at least in part by the time at which the data transfer between the first client device 102 and the second client device 104 is taking place. For example, there may be a predefined schedule of symbol maps to be selected for use at different times. In this example, both the first client device 102 and second client device 104 are configured to utilize one symbol map for communications that occur between 10:05 and 10:06 AM, and utilize another symbol map for communications that occur between 10:06 and 10:07 AM. In this way, the symbol map may be consistently changing over time. Such scheduling information may, for instance, be made available to by one or more cloud computing devices that are in communication with the first and second client devices 102 and 104. In some implementations, the first and second client devices 102 and 104 may be pre-programmed with the scheduling information described above. One or more other external factors may, in some implementations, influence the particular symbol map that is to be utilized for a data transfer.

The second client device 104 may identify the symbol map to be utilized in the data transfer with first client device 102 (510). As described above, the second client device 104 may identify the symbol map by referencing scheduling information that indicates a particular symbol map to be utilized for the time at which 510 occurs. In some implementations, the first client device 102 may indicate which symbol map is to be utilized in a header portion included in the transmitted audio signal. For instance, the first client device 102 may transmit audio encoded with data that specifies the particular symbol map that is to be used to decode melody 520.

Upon receiving such data specifying the particular symbol map, the second client device 104 may select the corresponding symbol map in preparation for receiving and decoding an incoming melody 520. In some implementations, this header portion may be included in a portion of the audio signal that immediately precedes melody 520. In some examples, the first client device 102 and second client device 104 may have an otherwise agreed-upon symbol map that both devices intend to use in transferring data. Such an agreed-upon symbol map may be one which, for instance, is hard-coded by both devices.

The symbol map utilized in this example may include the melody 520 following an chord progression in the key of C major. Since the first client device 102 adheres to this symbol map in playing melody 520 for the second client device 104, the first client device 102 may, for the duration of measure 530, transmit symbols mapped onto a C chord (532).

The second client device 104 may receive and decode the portion of melody 520 that corresponds to measure 530 using a C filter bank (534). That is, the second client device 104 may extract data values encoded in measure 530 by specifically considering occurrences of musical notes C, E, and G, e.g., the musical notes included in a C chord.

For measure 540, the first client device 102 may transmit symbols mapped onto an F chord (542). That is, the chord progression included in the symbol map specifies an I to IV chord change corresponding to a transition from measure 530 to measure 540. In other words, the first client device 102 may encode data in measure 540 using an ordered sequence of the musical notes F, A, and C, e.g., the musical notes included in an F chord. The second client device 104 may correspondingly decode received data using an F chord filter bank (544).

For measure 550, the first client device 102 may transmit symbols mapped onto a $G^7$ chord (552). That is, the chord progression included in the symbol map specifies a IV to $V^7$ chord change corresponding to a transition from measure 540 to measure 550. In other words, the first client device 102 may encode data in measure 550 using an ordered sequence of the musical notes F, G, B, and D, e.g., the musical notes included in a $G^7$ chord. The second client device 104 may correspondingly decode received data using a $G^7$ chord filter bank (554).

For measure 560, the first client device 102 may transmit symbols mapped onto a C chord (562). That is, the chord progression included in the symbol map specifies a $V^7$ to I chord change corresponding to a transition from measure 550 to measure 560. In other words, the first client device 102 may encode data in measure 560 using an ordered sequence of the musical notes C, E, and G, e.g., the musical notes included in a C chord. The second client device 104 may correspondingly decode received data using a C chord filter bank (564).

Figure 6:
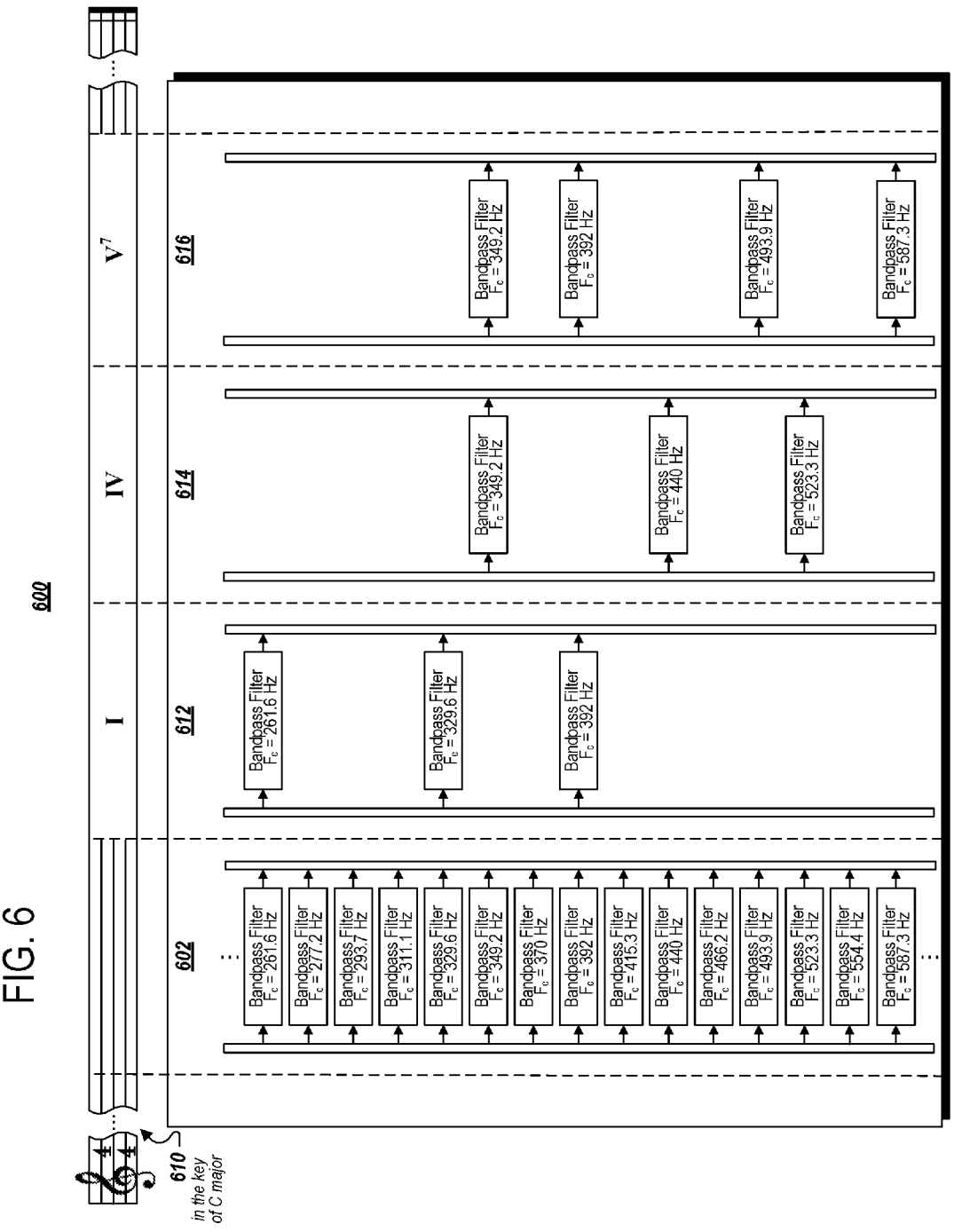
FIG. 6 is a conceptual diagram of an exemplary framework for decoding data from audible harmonies in a system.

FIG. 6 is a conceptual diagram of an exemplary framework for decoding data from audible harmonies in a system 600. The system 600 may, for example, be similar to that of the second client device 104 that has been described above in association with FIG. 5. That is, system 600 may be representative of a configuration for a device that receives and decodes audio signals according to a symbol map.

In some implementations, system 600 may be representative of a configuration for a digital signal processor that may be utilized by a device in receiving and decoding audio signal according to a symbol map. The system 600 may include a set of filters 602. For example, the second client device 104 may utilize one or more of the filters in set 602 to isolate individual notes included in a melody 610 that is produced by the first client device 102. Each filter included in the set of filters 602 may be a bandpass filter that has a center frequency that corresponds to each semitone included in at least a portion of the musical scale.

FIG. 6, for example, depicts set of filters 602 as including a bandpass filter for each semitone ranging from $C_4$ to $D_5$. The particular bandpass filter utilized to isolate $C_4$, for example, may have a center frequency of 261.6 Hz. Similarly, the particular bandpass filter utilized to isolate $D_5$, for example, may have a center frequency of 587.3 Hz. While set of filters 602 is depicted as including filters for semitones in the 4$^{th}$ and 5$^{th}$ octaves, it is clear that the set of filters utilized may include filters for any desired number of octaves or portions thereof.

The set of filters depicted at 612 may represent the particular subset of bandpass filters that may be utilized in the decoding of an I chord. Since melody 610 is in the key of C major in this example, the set of filters 612 may include bandpass filters with center frequencies of 261.6 Hz, 329.6 Hz, and 392 Hz. That is, the set of filters 612 may be considered to be a C chord filter bank that isolates musical notes $C_4$, $E_4$, and $G_4$. The set of filters 612 may, for instance, depict the C filter bank as utilized by the second client device 104 in decoding data received at measures 530 and 560 of FIG. 5.

Referring again to FIG. 5, the set of filters 612 may be representative of a configuration of the second client device 104 employed at 534 and 564 according to the symbol map identified at 510. The set of filters 612 may, for instance, represent a configuration for filtering one or more portions of melody 610 with a structure that has been defined by the symbol map to have a chord K that can be described as:

$$K=\{C_4,E_4,G_4\} \quad (5)$$

The set of filters depicted at 614 may represent the particular subset of bandpass filters that may be utilized in the decoding of a IV chord. Since melody 610 is in the key of C major in this example, the set of filters 614 may include bandpass filters with center frequencies of 349.2 Hz, 440 Hz, and 523.3 Hz. That is, the set of filters 614 may be considered to be an F chord filter bank that isolates musical notes $F_4$, $A_4$, and $C_5$. The set of filters 614 may, for instance, depict the F filter bank as utilized by the second client device 104 in decoding data received at measure 540 of FIG. 5.

Referring again to FIG. 5, the set of filters 614 may be representative of a configuration of the second client device 104 employed at 544 according to the symbol map identified at 510. The set of filters 614 may, for instance, represent a configuration for filtering one or more portions of melody 610 with a structure that has been defined by the symbol map to have a chord K that can be described as:

$$K=\{F_4,A_4,C_5\} \quad (6)$$

The set of filters depicted at 616 may represent the particular subset of bandpass filters that may be utilized in the decoding of a V$^7$ chord. Since melody 610 is in the key of C major in this example, the set of filters 616 may include bandpass filters with center frequencies of 349.2 Hz, 392 Hz, 493.9 Hz, and 587.3 Hz. That is, the set of filters 616 may be considered to be an F chord filter bank that isolates musical notes $F_4$, $G_4$, $B_4$, and $D_5$. The set of filters 616 may, for instance, depict the G$^7$ filter bank as utilized by the second client device 104 in decoding data received at measure 550 of FIG. 5.

Referring again to FIG. 5, the set of filters 616 may be representative of a configuration of the second client device 104 employed at 554 according to the symbol map identified at 510. The set of filters 616 may, for instance, represent a configuration for filtering one or more portions of melody 610 with a structure that has been defined by the symbol map to have a chord K that can be described as:

$$K=\{F_4,G_4,B_4,D_5\} \quad (7)$$

It can be noted that, because the chord K corresponds to a seventh chord, or tetrad, the set of filters 616 may include four filters.

The set of filters 602 may be dynamically reconfigurable so as to enable the use of filter banks that correspond to any chord desirable. In some implementations, the filters included in set of filters 602 may be digital filters. The filters included in set of filters 602 may include Finite Impulse Response ("FIR") filters, Infinite Impulse Response ("IIR") filters, or a combination thereof.

In some implementations, the set of filters 602 may be implemented using one or more Fourier analysis techniques. For instance, the second client device 104 may take one or more Short-time Fourier Transforms ("STFT") of the audio signals that it picks-up using a microphone. Each STFT may be evaluated to determine which, if any, of the expected tones of which the respective STFT might indicate the presence. Such a determination may be made by analyzing magnitude information, e.g., peak estimation, in each STFT at each of the abovementioned center frequencies that correspond to notes of chords.

One or more digital signal processing processes may be performed in order to isolate audio signal data corresponding to each appropriate musical note and/or make determinations regarding which notes are played at a given point in melody 610. In some implementations, the filters in included in set of filters 602 may be analog filters. Dynamic reconfiguration of such filters may be performed using a network of switches to activate and deactivate the necessary filters. Reconfiguration may also be performed in post-processing of the output(s) of such filter circuitry. In some implementations, the filters utilized in the set of filters 602 may be a combination of analog and digital filtering techniques.

FIG. 7 is a flow chart illustrating an example of a process 700 for communicating data using audible harmonies. The process 700 may be performed by a device such as the first client device 102 which has been described above in association with FIGS. 1-6. However, the process 700 may be performed by other systems or system configurations.

The first client device 102 determines a set of audio attribute values to be modulated to transfer a data set to the second client device 104 (710). The set of audio attribute values may, for instance, be selected based on a musical relationship between the audio attribute values.

In some implementations, these audio attribute values may be pitch values to be played in a melody. In these implementations, the musical relationship between the pitch values may be a chordal relationship between the pitches. Such a chordal relationship between the pitches may be a major chord relationship, a minor chord relationship, a major seventh chord relationship, or a minor seventh chord relationship. For example, an I chord would correspond to a major chord relationship, while a V$^7$ chord would correspond to a major seventh chord relationship. In the examples described above, such a chordal relationship may correspond to the relationship between the pitches that are contained in a chord K.

In some implementations, the set of audio attributes may be duration values and the musical relationship is a rhythmic relationship between the durations. In the examples described above, such duration values may correspond to duration(s) D and such a rhythmic relationship may correspond to one or more sequences of audio of particular duration(s). The rhythmic relationship might also correspond to a tempo or time signature defined for a melody. In some implementations, the set of audio attribute values are envelope shape parameter values. These may be ADSR values, for example, such as attack time, decay time, sustain level, and release level.

The first client device 102 determines a symbol map associating each possible data value for the data set with an ordered sequence of audio attribute values from the set of audio attribute values (720). The symbol map determined by the first client device 102 may effectively define an encoding of data values onto an audio attribute structure. When considering data values on the scale of bytes, the symbol map can be seen as defining a mapping from a radix-256 data value to a mixed-radix representation.

The symbol map may include a chord progression that includes a plurality of sets of pitch values, and timing information indicating when each set of pitch values will be used. Each set of pitch values may, for example, be selected based on a chordal relationship between the pitch values in the set. Such a chordal relationship may be similar to that which has been described above in association with 710. In this way, the symbol map may, at least in part, define a melody encoded with data values that is to be played by the first client device 102.

The first client device 102 sends the data set to one or more receiving devices, such as the second client device 104. For this step, the first client device 102 may determine, for each data value in the data set, the ordered sequence of audio attribute values associated with the data value from the symbol map (730) and play an ordered sequence of sounds representing a data value (740), with each sound having an audio attribute value in the determined ordered sequence of audio attribute values. This process may be similar to that which has been described above in reference to the first client device 102 playing an audio signal that includes a melody using one or more electroacoustic transducers, such as a speaker.

In some implementations, the symbol map is stored by the one or more receiving devices, such as the second client device 104, before the data set is sent. In these implementations, the one or more receiving device may store a plurality of different symbol maps, and sending the data set may include sending a header including an identifier of a particular symbol map to be used when transferring the data set.

In some implementations, the process of sending the data set may include sending a header between the sending device, such as the first client device 102, and the receiving devices, such as the second client device 104, that includes the symbol map. The sending device, for example, may send the symbol map to the receiving devices by playing an ordered sequence of sounds representing each data value in the symbol map based on a default symbol map. In this way, new and unique symbol maps can be implemented on-the-fly. This may allow for a great degree of customization.

FIG. 8 is a flow chart illustrating an example of a process 800 for communicating data using audible harmonies. The process 800 may be performed by a device such as the second client device 104 which has been described above in association with FIGS. 1-7. However, the process 800 may be performed by other systems or system configurations.

The second client device identifies a symbol map associating each data value in a data set with an ordered sequence of audio attribute values (810). The set of audio attribute values may, for instance, be selected based on a musical relationship between the audio attribute values.

In some implementations, these audio attribute values may be pitch values to be played in a melody. In these implementations, the musical relationship between the pitch values may be a chordal relationship between the pitches. Such a chordal relationship between the pitches may be a major chord relationship, a minor chord relationship, a major seventh chord relationship, or a minor seventh chord relationship. For example, an I chord would correspond to a major chord relationship, while a $V^7$ chord would correspond to a major seventh chord relationship. In the examples described above, such a chordal relationship may correspond to the relationship between the pitches that are contained in a chord K.

In some implementations, the set of audio attributes may be duration values and the musical relationship is a rhythmic relationship between the durations. In the examples described above, such duration values may correspond to duration(s) D and such a rhythmic relationship may correspond to one or more sequences of audio of particular duration(s). The rhythmic relationship might also correspond to a tempo or time signature defined for a melody. In some implementations, the set of audio attribute values are envelope shape parameter values. These may be ADSR values, for example.

The second client device 104 receives a plurality of sounds from a sending device (820), such as the first client device 102. This process may be similar to that which has been described above in reference to the second client device 104 receiving an audio signal that includes a melody by using one or more acoustic-to-electric transducers, such as a microphone.

The second client device 104 identifies ordered sequences of the received sounds that have audio attribute values associated with data values in the symbol map (830). The symbol map utilized by the second client device 104 may effectively define how data values are to be deduced from a received melody. For example, the symbol map may include a chord progression that includes a plurality of sets of pitch values, and timing information indicating when each set of pitch values will be used. Each set of pitch values may, for example, be selected based on a chordal relationship between the pitch values in the set. Such a chordal relationship may be similar to that which has been described above in association with 810.

The second client device 104 assembles the data values according to an order in which the identified sequences were received to form the data set (840). That is, the second client device 104 may chain together the data conveyed by each symbol included in the melody played by the first client device 102.

In some implementations, the second client device 104 may receive a header from the sending device, such as the first client device 102, which includes an identifier of a particular symbol map to be used when transferring the data set. In these implementations, the second client device 104 may store a plurality of different symbol maps and use the identifier included in the header sent by the first client device to select the particular symbol map to be used.

In some implementations, the process of receiving the plurality of sounds from the sending device, such as the first client device 102, includes receiving a header from the sending device including the symbol map. In these implementations, the process of receiving the symbol map may include receiving an ordered sequence of sounds representing each data value in the symbol map based on a default symbol map. In this way, new and unique symbol maps can be implemented on-the-fly. This may allow for a great degree of customization.

Referring again to customization features provided by the techniques described herein, in some implementations, one or more users of the first and second client devices 102 and 104 may create their own "signature" sound that is to be utilized for audible data transfer. For instance, one or more applications running on the first or second client devices 102 and 104 may provide users with tools to create and modify a melody structure, S, on top of which data values are encoded.

In these implementations, users may be able to define the characteristics of the melody at an individual-parameter-level. In some implementations, a musical interface may be provided to allow a user to create and store structures. Such a musical interface may, for instance, function as a digital audio workstation and may include one or more of a MIDI keyboard, synthesizer software for instrument emulation and timbre generation, and music composition software.

In some implementations, the user may be able to select from among a predetermined set of structures. Each melody structure, S, may be a unique configuration of parameters, e.g., chords K, durations D, number of tones T, and envelope/ADSR. In some examples, there may be multiple predetermined presets for different parameters that each user may be able to customize.

For example, there may be multiple chord progression presets that a user may be able to choose from. In this example, popular chord progressions such as I-V-vi-IV, I-vi-IV-V, I-V-vi-iii-IV-I-IV-I-V, I-I-I-I-IV-IV-I-V-V-I, ii-IV-V, I-IV-V-IV, V-IV-I, vi-V-IV-III, and ii-I-V/vii-bVII may be provided for user selection. Each user may also be able to easily select the key in which a melody is to be played in, as well as other parameters, such as tempo and time signature.

Such structures may be associated with one or more of a graphical and textual description of the structure. For example, some structures may emulate voices. The graphical and textual descriptions associated with such structures may, for example, be representative of a different fictional character to which the particular "voice" belongs. In one example, a user may be able to select one of a "sad robot," a "happy robot," and a "crazy robot," as the voice in which data may be transferred. In this way, users may be given the ability to express themselves through this audible medium. In some examples, data that indicates a selected voice may be included in header information, such as that which has been described above, to encode the choice of customization that is used for the structure of the rest of the signal.

In some implementations, the different structures described above may be made available through one or more applications that are running on the sending and/or receiving devices. For example, users may be able to download new structures to be used for making data transfers. In some examples, users may be able to create new structures and share them with others. In these examples, a receiving device, such as the second client device 104, may be able to store newly-received symbol maps so that a user of the second client device 104 may be able to later use a structure used by their friend. Consider the example described above in association with FIG. 1. In this example, the structure for the favorite classic rock song may have been created by the user of the first client device 104. Accordingly, the structure for the favorite classic rock song may be indicated in a symbol map included in a header that is sent from the first client device 102 to the second client device 104.

Upon receiving the header, the second client device 104 may use the symbol map to decode the melody which follows the header and may further store the symbol map so that the user of the second client device 104 may be able to send data to others to the tune of the favorite classic rock song. In addition, the first and second client devices 102 and 104 may be able to simply provide an identifier corresponding to the symbol map for the favorite classic rock song after it has been stored at both devices. In some implementations, device users may be able to collaborate in their creation of melody structures.

Although major and minor triads and seventh chords have been described in examples above, it is clear that the techniques described herein may utilize any harmonic set of notes as a chord. For example, the techniques described herein may utilize harmonic sets of notes such as a chords that may be described as being one or more of a major triad, minor triad, augmented triad, diminished triad, diminished seventh, half-diminished seventh, minor seventh, minor major seventh, dominant seventh, major seventh, augmented seventh, augmented major seventh, dominant ninth, dominant eleventh, dominant thirteenth, seventh augmented fifth, seventh flat ninth, seventh sharp ninth, seventh augmented eleventh, seventh flat thirteenth, half-diminished seventh, add nine, add fourth, add sixth, six-nine, mixed-sixth, sus2, sus4, and Jazz sus. In some examples, the audio signals described above may include one or more of a treble and bass section.

In some implementations, the music played in such data transfers may include additional musical components. This might include additional notes that are played for aesthetical purposes, but may not be representative of encoded data values. Such musical components may be simply filtered out or otherwise ignored by the receiving device when decoding data values.

Figure 9:
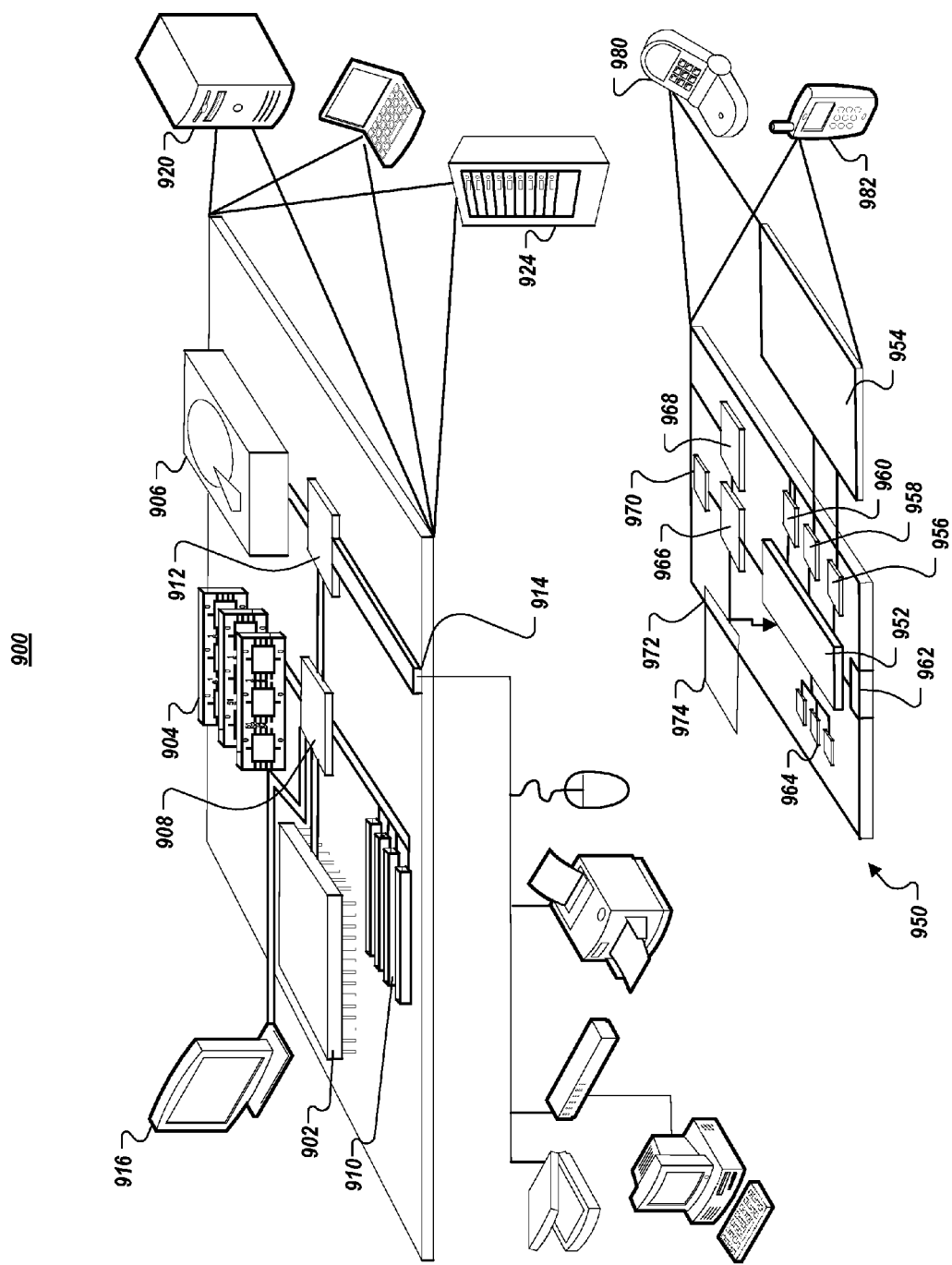
FIG. 9 is a diagram of exemplary computing devices.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate.

The processor 902 can process instructions for execution within the computing device 900, including instructions stored in the memory 904 or on the storage device 906 to display graphical information for a graphical user interface (GUI) on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices, for example, processor 902, perform one or more methods, such as those described above. The instructions can also be stored by one or more storage devices such as computer- or machine-readable mediums, for example, the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916, e.g., through a graphics processor or accelerator, and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user.

The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface.

The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices, for example, processor 952, perform one or more methods, such as those described above. The instructions can also be stored by one or more storage devices, such as one or more computer- or machine-readable mediums, for example, the memory 964, the expansion memory 974, or memory on the processor 952. In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound, e.g., voice messages, music files, etc., and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus.

Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method executed by one or more processors, the method comprising:
   determining at a first device, from among a plurality of different musical relationships, a particular musical relationship for generating a set of audio attribute values that are particular to the particular musical relationship, the set of audio attribute values to be modulated to transfer a data set to a second device, and wherein each set of audio attribute values are different from each other for each set of particular musical relationships;
   selecting, based on the particular musical relationship, the set of audio attribute values that are particular to the particular musical relationship; and
   transferring the data set to the second device by encoding the data set in an audio signal generated from modulating the audio attribute values.

2. The method of claim 1, wherein the plurality of different musical relationships include a chordal relationship and a rhythmic relationship.

3. The method of claim 2, wherein the selected musical relationship is a chordal relationship and each audio attribute value of the generated set of audio attribute values includes a pitch value.

4. The method of claim 3, wherein the chordal relationship is a major chord relationship, a minor chord relationship, a major seventh chord relationship, or a minor seventh chord relationship.

5. The method of claim 2, wherein the selected musical relationship is a rhythmic relationship and each audio attribute value of the generated set of audio attribute values includes a duration value.

6. The method of claim 5, wherein the rhythmic relationship includes defining a tempo or time signature for a melody.

7. The method of claim 1, wherein the set of audio attributes values are envelope shape parameter values.

8. The method of claim 1, wherein generating the audio signal generated from modulating the audio attribute values further comprises determining a symbol map associating each possible data value for the data set with an ordered sequence of audio attribute values from the set of audio attribute values.

9. The method of claim 8, wherein the symbol map includes a set of notes and a set of chords for modulating the data set.

10. The method of claim 9, wherein the particular musical relationship between the set of notes and the set of chords included in the symbol map can be specified by a particular key and/or scale.

11. The method of claim 10, wherein each possible data value is represented by playing an ordered sequence of one or more sounds, and wherein each of the one or more sounds in the ordered sequence includes a plurality pitches played substantially simultaneously.

12. The method of claim 8, wherein the symbol map includes a chord progression including a plurality of sets of pitch values, and timing information indicating when each set of pitch values will be used to send associated data values, wherein each set of pitch values are selected based on a chordal relationship between the pitch values in the set.

13. The method of claim 8, wherein transferring the data set from the first user device to the second user device includes sending a header, wherein the header includes the symbol map.

14. The method of claim 8, wherein a plurality of symbol maps are stored on the second user device.

15. The method of claim 14, wherein transferring the data set from the first user device to the second user device includes sending a header identifying a particular symbol map from the plurality of symbol maps used to modulate the data set.

16. A system comprising:
a first user device operable to interact with a second user device through a data communication network, wherein the first user device is further operable to:
determine, at the first device, from among a plurality of different musical relationships, a particular musical relationship for generating a set of audio attribute values that are particular to the particular musical relationship, the set of audio attribute values to be modulated to transfer a data set to the second device, and wherein each set of audio attribute values are different from each other for each set of particular musical relationships;
select, based on the particular musical relationship, the set of audio attribute values that are particular to the particular musical relationship; and
transfer the data set to the second device by encoding the data set in an audio signal generated from modulating the audio attribute values.

17. The system of claim 16, wherein the plurality of different musical relationships include a chordal relationship and a rhythmic relationship.

18. The system of claim 17, wherein the selected musical relationship is a chordal relationship and each audio attribute value of the generated set of audio attribute values includes a pitch value.

19. The system of claim 17, wherein the selected musical relationship is a rhythmic relationship and each audio attribute value of the generated set of audio attribute values includes a duration value.

20. A computer storage medium encoded with a computer program, the program comprising instructions that when executed by data processing apparatus case the data processing apparatus to perform operations comprising:
determining at a first device, from among a plurality of different musical relationships, a particular musical relationship for generating a set of audio attribute values that are particular to the particular musical relationship, the set of audio attribute values to be modulated to transfer a data set to a second device, and wherein each set of audio attribute values are different from each other for each set of particular musical relationships;
selecting, based on the particular musical relationship, the set of audio attribute values that are particular to the particular musical relationship; and
transferring the data set to the second device by encoding the data set in an audio signal generated from modulating the audio attribute values.

* * * * *